United States Patent Office 3,431,163
Patented Mar. 4, 1969

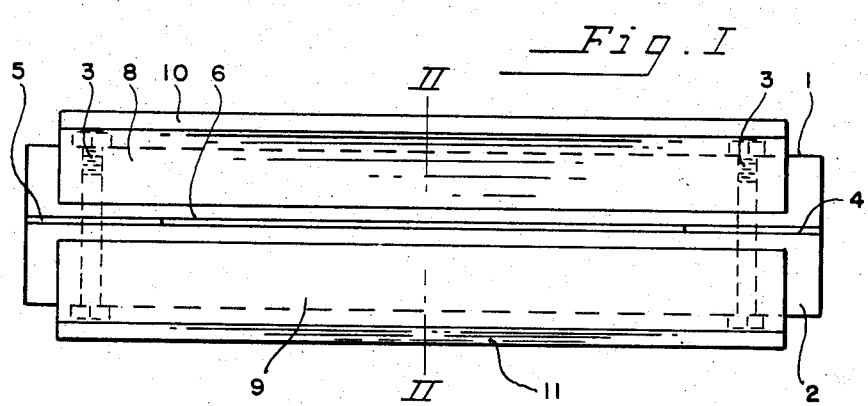
Fig. I
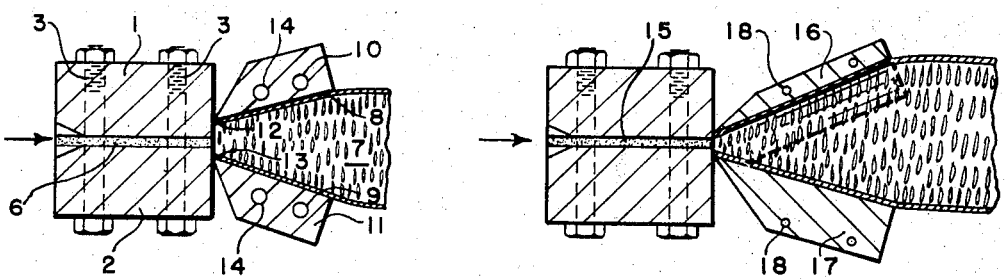
Fig. II  Fig. IV
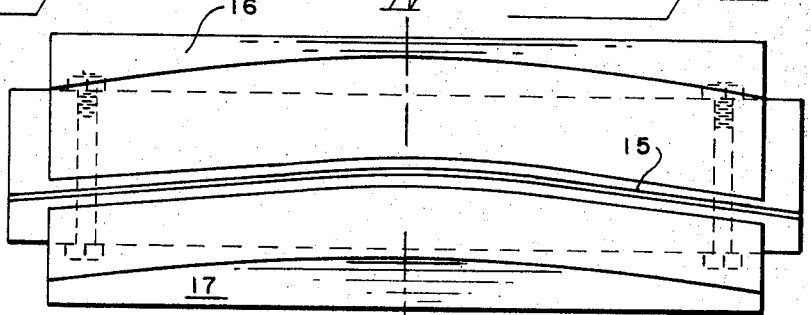
Fig. III
J. H. GILBERT  INVENTOR.
ATTORNEY.

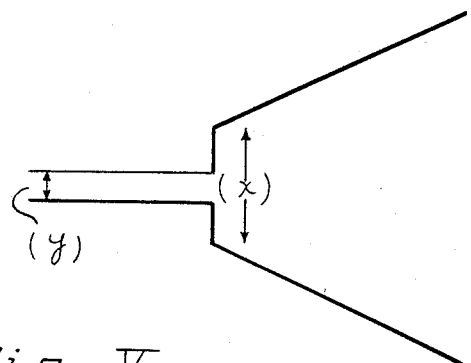
_Fig. V_
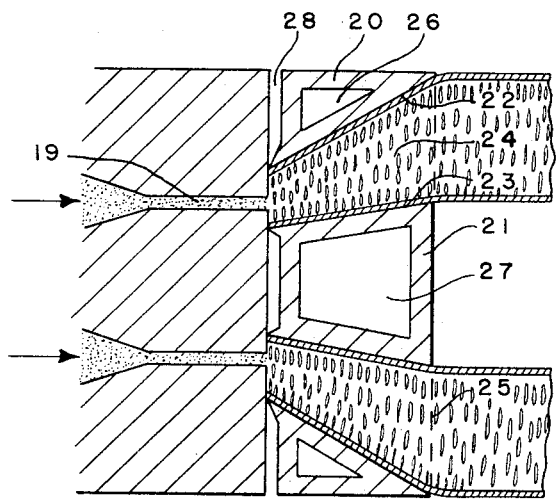
_Fig. VI_

3,431,163
FOAMED ALIPHATIC RESIN PRODUCTS HAVING ELONGATED CELLS AT RIGHT ANGLES TO A SURFACE SKIN AND THEIR MANUFACTURE
John Harold Gilbert, Chepstow, England, assignor to Monsanto Chemicals Limited, London, England, a British company
Filed June 29, 1965, Ser. No. 468,052
Claims priority, application Great Britain, July 9, 1964, 28,280/64
U.S. Cl. 161—161                          15 Claims
Int. Cl. B32b 3/12, 27/32, 7/02

ABSTRACT OF THE DISCLOSURE

Foamed aliphatic thermoplastic resin products comprising a mass of substantially parallel elongated cells oriented at right angles to an enclosing surface skin and exhibiting a density drop across the mass such that the density is lowest at the center and increases in an outward direction; processes for making such products by extruding a foamable composition through a die orifice into a zone of lower pressure defined by stationary surfaces which, at their upstream ends, are spaced apart by a distance 1.5–5 times greater than the width of the die orifice and are spaced gradually further apart from each other along the direction of extrusion and which are cooled sufficiently to solidify the resin in contact with them and thus create a frictional drag; and dies suitable for use in such processes.

---

This invention relates to foamed resins, and in particular to a new extruded foamed resin, to a new process for extrusion, and to a new extrusion die.

Foamed thermoplastic resins such as for example foamed polyethylene are useful industrial products because of their excellent insulation properties and the degree of resilience which they possess. They can be made by moulding processes, but it would be convenient in certain respects to produce them by extrusion. There are, however, difficulties associated with the consistent production of a foamed board or sheet (or some other section) of good quality by extrusion. There is for example in the formation of an extruded sheet a tendency for warping and wrinkling to occur.

Therefore, it is an object of this invention to provide an extruded aliphatic thermoplastic foamed resin.

Another object of this invention is to provide a process for extruding an aliphatic thermoplastic foamed resin.

Still another object of this invention is to provide a novel die for extruding an aliphatic thermoplastic foamed resin.

The new foamed product of the invention is an extruded foamed aliphatic thermoplastic resin comprising a mass of substantially parallel elongated cells enclosed by a surface skin, the elongated cells being orientated substantially at right angles to the surface skin. The elongated cells have in most instances a ratio of length to width of between 1.2–7 to 1. Preferably the aliphatic thermoplastic resin is a polyolefin resin, such as polyethylene or polypropylene.

The surface skin of the foamed product is in a foamed condition, but it is foamed to a considerably less extent thus having a higher density than the main inner mass of the foamed product. The surface skin normally is orientated in the direction of extrusion. In general there is a density drop across the mass of elongated cells, with the density being lowest at the centre and increasing in an outwards direction. The foamed product is usually flexible, particularly when it is a polyolefin such as for example polyethylene.

The cells are as has been stated elongated ones, and often the ratio of length to width is between 1.2–7 to 1, for example between 1.5–5. An average figure is sometimes about 2–3 to 1. The width of a cell is the width at the mid-point of the cell in a plane at right angles to the longer axis. Normally the cells are of substantially circular cross-section and their width is then the diameter, but the cells can be for example of elliptical or hexagonal cross-section. The diameter of the cells can vary between 0.001 and 0.05 inch, for example they can be in the range of 0.002 to 0.01 inch.

The process of the invention is one for the production of an extruded foamed aliphatic thermoplastic resin comprising a mass of substantially parallel elongated cells enclosed by a surface skin and wherein the elongated cells are oriented substantially at right angles to the surface skin, which process comprises extruding a foamable aliphatic thermoplastic resin through a die orifice into a zone of lower pressure which zone is defined by stationary surfaces which are cooled, solidifying the surface of the resin in contact with the stationary surfaces which are spaced progressively further apart from each other along the direction of extrusion and foaming the resin as it moves through the zone.

Preferably there is a step between the die orifice and the apex of the stationary surfaces that are spaced progressively apart, that is to say the distance apart of the stationary surfaces at the apex which is the point at which they are nearest is greater than the width of the die orifice. Thus for example in the instance of a slit die the cross-section is as shown in FIGURE V in the attached drawings, with the step being the dimension $x$ and the width of the slit orifice being $y$. Then where a step is present $x$ is of course greater than $y$, and may be for example from 1.5 to 4 or 5 times as great, for instance from 2 to 4 times. About 3 times as large is often a useful relationship. Where an annular die is employed there is a step on both sides of the die orifice as indicated for example in FIGURE VI.

The invention also includes a die suitable for the extrusion of a foamed aliphatic thermoplastic resin, having a die orifice communicating with a zone defined by stationary surfaces that are equipped with means for cooling them and are spaced progressively further apart from each other along the direction of extrusion, there being a step between the die orifice and the apex of the stationary surfaces.

The aliphatic thermoplastic resin is one derived by polymerization including copolymerization of an ethylenically unsaturated monomer. Very often the monomer is preferably an ethylenically unsaturated hydrocarbon or olefin, but it can for instance be a nitrile, such as acrylonitrile; vinyl or vinylidene chloride; vinyl acetate; or an acrylate, such as ethyl acrylate or methyl methacrylate. Where the monomer is a hydrocarbon this can for instance be ethylene, propylene or a butylene, for instance the polymer can be polyethylene of either low density or high density or polypropylene. Moreover a copolymer can be employed of one of the hydrocarbon monomers such as ethylene with another monomer, such as one of those given above. Thus the copolymer can for example be an ethylene-vinyl acetate copolymer.

The overall density of the extruded product can vary between fairly wide limits, and it can be between 1 pound per cubic foot or slightly less to 10 pounds per cubic foot or more. A density between 1 and 7 pounds per cubic foot, such as between 1.5 or 2 and 4 or 5 pounds per cubic foot is often very useful, particularly in the case of a foamed polyethylene product. As has been stated the foamed product has an exterior skin; this outer skin, which may be for example of the order of 0.005 inch thick, can have a density that is for instance from 5 to 10 times the average density of the inner mass of elongated cells. The latter have an average density that is often about 10% less than that of the overall density for the whole extruded product.

In the process of the invention there is employed a foamable resin composition, which requires the presence of a blowing agent. This is preferably a normally gaseous substance but it can be a volatile liquid. In many cases the blowing agent is one that is normally gaseous but which while under pressure before extrusion is present in the liquid state. Examples of volatile substances that can be used include lower aliphatic hydrocarbons, such as ethane, propane, a butane or butene, or a pentane or pentene; lower alkyl halides, such as methyl chloride, trichloromethane or 1,2-dichlorotetrafluoroethane; and inorganic gases such as carbon dioxide or nitrogen. The lower aliphatic hydrocarbons, especially a butane, or mixture of butanes, are preferred. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. From 3 to 30%, especially 7 to 20%, by weight based on the weight of the resin is often a suitable proportion of blowing agent, and for example the use of from 7 to 15% by weight of butane in conjunction with polyethylene has given excellent results.

Preferably the foamable resin contains a nucleating agent or fine cell size additive which assists in the formation of a large number of small cells. A wide range of nucleating agents can be employed, including finely divided inert solids such as for example silica or alumina, preferably in conjunction with zinc stearate, or small quantities of a substance that decomposes at the extrusion temperature to give a gas. An example of the latter class of nucleating agents is sodium bicarbonate, used if desired in conjunction with a weak acid such as for example tartaric acid or citric acid. A small proportion of the nucleating agent, for example up to 5% by weight of the resin is usually effective.

In general in the process for the production of the foamed product, expansion occurs as the foamable resin leaves the die-orifice, and accordingly the dimensions of the latter are less than the cross-section of the required product. For example in the instance of a slit die expansion takes place along both dimensions; for instance a board 3 inches wide might be obtained from a slit die of 2 inch width. By choice of a suitable die size an extruded product of the desired cross-section can be obtained. For example foamed board can be produced up to 4 feet or more in width, and with a thickness of up to perhaps 2 inches. In general the thickness can be between 0.1 inch and 2 inches or more; it can for example be between 0.5 inch and 1 inch. In general a foamed product can be curved or flat, depending on the die design.

In the die the actual die orifice can be one of the type conventionally used, for example a straight slit die orifice or an annular die orifice.

The surfaces defining the zone are equipped with means for cooling them. Water-cooling is often the most satisfactory means to employ and it can for instance be applied through channels within the surfaces. Normally there is a step between the surfaces of this cooling zone and the die orifice, as has been explained. It is desirable to prevent as far as possible the conduction of heat from the extruder to the cooled surfaces, and this can be achieved for example by use of a thermally insulating material or by arranging for the area of contact between the surfaces and the extruder to be as small as possible. The surfaces defining the zone are cooled so as to solidify the foamed resin in contact with them, and to cause a certain amount of "drag" as the resin is extruded. The temperature of the zone-defining surfaces used in a particular instance namely the average temperature of the mass of metal depends partly on the nature of the resin and any plasticising effect of the blowing agent, but very often a temperature of from 20° to 60° C. lower than the extrusion temperature can be used. For example when a foamed resin is being extruded at 105° C., it is usually suitable for the zone-defining surfaces to be cooled to between 45° C. and 80° C.

The extrusion dies of this invention are best described in the following drawings wherein:

FIGURE I is a front elevation of a slit die;
FIGURE II is a section along the line II—II in FIGURE I;
FIGURE III is a front elevation of a die for producing a curved section;
FIGURE IV is a section along the line IV—IV in FIGURE III;
FIGURE V is a schematic of the step between the die orifice and stationary surfaces;
FIGURE VI is a section of an annular die for producing a tube of foamed material.

The die shown in FIGURES I and II comprises two mild steel blocks 1 and 2 held together by four bolts 3 and having a pair of shim steel spacers 4 and 5, 0.040 inch thick, between them so that there is formed a slit orifice 6 0.040 inch wide, 2 inches long and having a land i.e. the dimension measured along the direction of extrusion of 0.75 inch. The slit communicates with a zone 7 defined by the surfaces 8 and 9 of two mild steel plates 10 and 11 each 5 inches by 1 inch by ½ inch thick. The plates have knife edges 12 and 13 in contact with the outer faces of the blocks 1 and 2 and have adjustable clamp mountings (not shown) by means of which they can be set at various angles to each other as desired. The knife edges 12 and 13 in contact with the blocks 1 and 2 at a distance apart which is greater than the width of the slit orifice 6. A series of water-cooling channels 14 is drilled through each plate as shown. The die has means (not shown) for attaching it to the front end of the extruder, so that when the die is in use a foamable resin such as for instance foamable polyethylene is fed into the slit in the direction of the arrow and thence through the zone into the atmosphere.

In the die shown in FIGURES III and IV there is a curved slit 15, and the plates 16 and 17 have convex and concave surfaces respectively so that a foamed resin can be produced having a curved cross-section. The plates are equipped with water-cooling channels 18. Again the knife edges of the plates 16 and 17 are further apart than the width of the slit 15.

FIGURE VI shows a die suitable for the production of a tube of foamed resin. The die comprises an annular die orifice 19 having a diameter of 1 inch, a width of 0.04 inch and a land of 0.5 inch. Two mild steel blocks 20 and 21 are prepared, in part by machining and in part by welding, to the shapes shown and mounted one within the other so that their inner and outer surfaces 22 and 23 respectively define a zone 24 communicating with the die orifice 19. The mouth 25 of the zone is 0.5 inch away from the outer lip of the orifice 19, and the cross sections of the surfaces 22 and 23 at the mouth are 1.8 inch and 1.2 inch in diameter respectively. The blocks 20 and 21 have hollow interiors 26 and 27 as shown so that water for cooling can be circulated, and the outer block 20 has the face 28 that abuts on the die orifice partly cut away so as to minimize heat transfer to the block from the extruder. The hollow interiors 26 and 27 of the blocks are provided with inlet and outlet pipes (not shown) so that the cooling water can be circulated. The tube of foamed material is slit 3 feet from the die, so that the pipes for cooling water for block 21 can lead away from the extrusion operation.

In general the zone-defining surfaces can be plane or curved, depending on the shape of the final extruded section. For example, where a board is to be produced, the zone is preferably defined by two plane surfaces inclined to each other at an angle of between 10 and 50°, preferably between 15 and 30°, for instance about 20°; such a construction has been found to be particularly useful. On the other hand, curved extruded sections such as are useful for pipe insulation for example can be produced using a zone defined by appropriately curved surfaces which in this instance would in fact be continuous. Further, annular sections or tubes can be produced, and here the zone can be defined by two substantially conical surfaces, one within the other.

The extrusion temperature at the die or orifice depends to some extent on the softening point of the resin, but in general temperatures between 80° C. and 150° C. and preferably between 90° C., and 140° C., are suitable. For example, when foamable polyethylene is being extruded a temperature in the range of 100° C. to 120° C. can often be used, particularly about 110° C.

The pressure within the extruder is sufficient to prevent the resin foaming until it leaves the die orifice and enters the zone of lower perssure. A pressure for example greater than 250 pounds per square inch, and especially between 250 and 5000 pounds per square inch, can be employed. Preferably the pressure is between 300 and 1000 pounds per square inch. The pressure within the cooling zone is lower than the extrusion pressure. It is not uniform through the zone, but decreases along the direction of extrusion. Near the die orifice it can for example be up to 100 pounds per square inch, but is usually much lower than this, for example between 10 and 20 pounds per square inch.

The foamed resin and process of the invention are illustrated by the following example.

EXAMPLE

This example describes a new foamed polyethylene product and its production by a process according to the invention.

Polyethylene pellets containing 3% by weight of finely divided silica and 1% by weight of zinc stearate were mixed with 10% by weight of butane in a 1½ inch extruder fitted with a die similar to that described above and illustrated in FIGURES I and II but having a slit orifice of length 2 inches, a width 0.040 inch and a land of 0.75 inch. The extrusion temperature was 105° C. and the extrusion rate was 10 pounds per hour. On issuing from the slit the polytthylene passed into a zone defined by a pair of water-cooled plates 8 and 9 as shown in FIGURES I and II, having an included angle between them of 25°. The water-cooled plates were 0.1 inch apart at the apex, forming a step between the point at which the plates began and the die orifice. The temperature of the plates was maintained at 40° C. by circulation of cooling water.

There was produced a flat strip of foamed polyethylene 3 inches wide and ½ inch thick, having an overall average density of 2 pounds per cubic foot. The strength was good in both the transverse and longitudinal directions. It had a surface skin 0.005 inch thick of density 7 pounds per cubic foot. Expansion was found to have taken place predominantly at right angles to the direction of extrusion of the strip, and the elongated cells of the main mass of material had an average diameter 0.067 inch and an average length of 0.1 inch.

What is claimed is:
1. A foamed aliphatic thermo-plastic resin comprising a mass of substantially parallel elongated cells having an orientation substantially at right angles to an enclosing surface skin integral with said mass, the density of said mass of elongated cells being lowest at the center and increasing in an outward direction.

2. The foamed resin of claim 1 in which the resin is a polymer of an ethylenically unsaturated hydrocarbon monomer.

3. The foamed resin of claim 1 in which the ratio of length to width of the cells is 1.2–7.0 to 1.0.

4. The foamed resin of claim 1 in which the diameter of the cells is 0.002 to 0.01 inch.

5. A process which comprises extruding a foamable aliphatic thermoplastic resin through a die orifice into a zone of lower pressure defined by stationary surfaces which, at their upstream ends, are spaced apart by a distance 1.5–5 times greater than the width of the die orifice and are spaced gradually further apart from each other along the direction of extrusion such that foaming of the resin occurs as it moves through the zone, said surfaces being maintained at a temperature 20–60° C. lower than the extrusion temperature to solidify the resin in contact with them and thus create a frictional drag as the resin moves through the zone.

6. The process of claim 5 wherein the foamable aliphatic thermoplastic resin composition contains a normally gaseous substance as a blowing agent.

7. The process of claim 5 in which the blowing agent is butane.

8. The process of claim 5 in which the foamable aliphatic thermoplastic resin contains a nucleating agent.

9. The process of claim 8 in which the nucleating agent is silica.

10. The process of claim 5 in which the extrusion temperature is 90° C.–140° C.

11. A die suitable for the extrusion of a foamable aliphatic thermoplastic resin, said die having a die orifice communicating with a zone defined by stationary surfaces that are equipped with means for cooling them and which, at their upstream ends, are spaced apart by a distance 1.5–5 times greater than the width of the die orifice and are spaced gradually further apart from each other along the direction of extrusion.

12. The die of claim 11 in which the distance between the stationary surface at their upstream ends is 2–4 times the width of the orifice.

13. The die of claim 11 in which the surfaces are equipped with means for water-cooling.

14. The die of claim 11 in which the die orifice is a straight slit die and the zone is defined by two plane surfaces inclined to each other at an angle of 15–30°.

15. The die of claim 11 in which the die orifice is annular and the zone is defined by two substantially conical surfaces one within the other.

References Cited

UNITED STATES PATENTS

| 3,144,492 | 8/1964 | Lightner et al. | 264—47 |
| 3,231,439 | 1/1966 | Voelker | 264—47 XR |
| 3,299,192 | 1/1967 | Lux | 264—48 |
| 2,537,977 | 1/1951 | Dulmage | 264—53 |
| 2,740,157 | 4/1956 | McCurdy et al. | 264—53 |
| 2,893,877 | 7/1959 | Nickolls | 264—321 XR |
| 3,026,564 | 3/1962 | Kohlwey | 18—14 XR |
| 3,121,130 | 2/1964 | Wiley et al. | 264—53 |

FOREIGN PATENTS

| 225,024 | 10/1959 | Australia. |
| 451,864 | 10/1948 | Canada. |
| 986,585 | 8/1951 | France. |

PHILIP E. ANDERSON, *Primary Examiner.*

U.S. Cl. X.R.

18—5, 12, 14; 138—149; 161—164, 166; 264—48, 53